US006067566A

United States Patent [19]
Moline

[11] Patent Number: 6,067,566
[45] Date of Patent: May 23, 2000

[54] METHODS AND APPARATUS FOR DISTRIBUTING LIVE PERFORMANCES ON MIDI DEVICES VIA A NON-REAL-TIME NETWORK PROTOCOL

[75] Inventor: William A. Moline, N. Reading, Mass.

[73] Assignee: Laboratory Technologies Corporation, Andover, Mass.

[21] Appl. No.: 08/732,909

[22] Filed: Oct. 17, 1996

Related U.S. Application Data

[63] Continuation-in-part of application No. 08/716,949, Sep. 20, 1996.

[51] Int. Cl.[7] ............................ G06F 13/38; G06F 15/17
[52] U.S. Cl. .......................... 709/219; 709/236; 345/302
[58] Field of Search ........................ 395/200.61, 200.49, 395/266, 249, 278; 345/302; 84/622; 709/231, 219, 236, 248

[56] References Cited

U.S. PATENT DOCUMENTS 5,058,159 10/1991 Quan ........................................ 380/19
5,388,264 2/1995 Tobias, II et al. ...................... 707/103
5,491,751 2/1996 Paulson et al. .......................... 380/25
5,524,051 6/1996 Ryan ........................................... 380/9
5,569,869 10/1996 Sone ......................................... 84/609
5,617,476 4/1997 Ibaraki ...................................... 380/49
5,654,516 8/1997 Tashiro et al. ........................... 84/601
5,670,729 9/1997 Miller et al. ............................. 84/609
5,723,802 3/1998 Johnson et al. ........................... 84/609
5,734,119 3/1998 France et al. ............................. 84/622
5,774,672 6/1998 Funahashi et al. ................ 395/200.61
5,793,980 8/1998 Glaser et al. ...................... 395/200.13
5,802,311 9/1998 Wronski ............................. 395/200.66
5,808,223 9/1998 Kurakake et al. ........................ 84/609
5,825,752 10/1998 Fujimori et al. ........................ 370/260

OTHER PUBLICATIONS

International search report in a now–abandoned PCT application whose disclosure includes the disclosure of the present patent application. The search report cites and explains the relevance of the above four references.

Pennybrook, Prof. Bruce, Faculty of Music, McGill University, *Class Notes,* Distributed Seminar—Winter 1996.

LeJeune, Urban A., *The New Netscape & HTML Explorer,* p. 337, The Coriolis Group, Inc., 1996.

Lipscomb, Eric, (BITNET:LIPS@UNTVAX), *Introduction into MIDI, North Texas Computing Center Newsletter,* "Benchmarks", Oct. 1989, . . . //www.harmony–central.com/MIDI/Doc/intro.hmtl.

Avatar Ontology: The Santa Fe Project, Oct. 1, 1996, pp. 1–3, URL: www.resrocket.com/sfproject.

*What is Res Rocket Surfer?, Internet Today Magazine,* Jan. 1996, www.resrocket.com/wwwhelp/whatis/html.

Microsoft WIN32 Programmer's Reference, vol. 2, *System Services, Multimedia, Extensions, and Application Notes,* pp. 521, 524, 525, 529, 530, 531.

Netscape Plug–in, API from World–Wide–Web 1996.

*Primary Examiner*—Mark H. Reinhart
*Attorney, Agent, or Firm*—Gordon E. Nelson

[57] ABSTRACT

Techniques for distributing MIDI tracks across a network using non-real-time protocols such as TCP/IP. Included are techniques for producing MIDI tracks from MIDI streams as the MIDI streams are themselves produced and distributing the MIDI tracks across the network, techniques for dealing with the varying delays involved in distributing the tracks using non-real-time protocols, and techniques for saving the controller state of a MIDI track so that a user may begin playing the track at any point during its distribution across the network. Network services based on these techniques include distribution of continuous tracks of MIDI music for applications such as background music, distribution of live recitals via the network, and participatory music making on the network ranging from permitting the user to "play along" through network jam sessions to using the network as a distributed recording studio.

27 Claims, 11 Drawing Sheets

601

METHODS AND APPARATUS FOR DISTRIBUTING LIVE PERFORMANCES ON MIDI DEVICES VIA A NON-REAL-TIME NETWORK PROTOCOL

CROSS REFERENCES TO RELATED APPLICATIONS

The present patent application is a continuation-in-part of a U. S. patent application, Ser. No. 08/716,949, entitled Progressively Generating an Output Stream with Real-time Properties from a Representation of the Output Stream which is not Monotonic with regard to Time filed Sep. 20, 1996 by the inventor of the present patent application. The assignee of the parent is the same as the assignee of the present patent application. The present application contains the entire Detailed Description and all of the Figures of the parent application. The new disclosure includes FIGS. 5–11 and begins with the section entitled Overview of Live Midi.

BACKGROUND OF THE INVENTION

1. Field of the Invention

The invention generally concerns using a transmission protocol which has no real-time properties to distribute a live performance across a network; more particularly, the invention concerns distributing live performances on MIDI devices across the Internet using the well-known TCP/IP protocols.

2. Description of the Prior Art

The Musical Instrument Digital Interface (MIDI) is a standard protocol for controlling electronic musical instruments such as synthesizers or the sound cards of personal computers. One common use of the protocol is permitting a musician to play more than one electronic instrument at once. The instrument that the musician is actually playing not only generates sounds, but also generates a sequence of event messages. An event message may for example be a note on message, that indicates that a note of a given pitch has started to sound or a note off message that indicates that the note has ceased sounding. Many other kinds of event messages are defined as well. Another instrument receives the event messages from the first instrument and responds by performing the actions indicated in the messages. Thus, if the message is a note on message, the other instrument will begin sounding the note, and will "play along with" the first instrument. For purposes of the present discussion, the event messages can be divided into two classes: the note on and note off messages and the remaining messages, which will be termed herein control messages.

The sequence of MIDI protocols to which a musical instrument directly responds is termed herein a MIDI stream. Devices which respond to a MIDI stream are termed herein MIDI devices. MIDI devices include electronic musical instruments and the sound boards of many computers. In a MIDI stream, time relationships between events are simply determined by when the events appear in the event stream. For example, if a note is to be held for a period of one second, the note on message for the note will appear in the MIDI stream one second before the note off message for the note appears in the stream. Since the MIDI device will start sounding the note in response to the note on message and stop sounding the note in response to the note off message, the note will be sounded for one second. It should be further noted at this point that the MIDI device may be assigned one or more channels. Each channel is represented by a channel number and each event message includes a channel number. A given MIDI device will respond to a given event message only if the channel number in the event message specifies one of the channels assigned to the MIDI device.

Each MIDI device has three connectors for the cables used to carry MIDI streams. One of the connectors is an output connector. The cable connected to it carries a MIDI stream of event messages that originate at the MIDI device; another of the connectors is an input connector; the connected cable carries a MIDI stream of event messages that the MIDI device will respond to if the event messages specify the channel currently assigned to the MIDI device. The third connector is a thru connector; the connected cable carries the MIDI stream received in the input connector.

The connectors and associated cables can be used to configure groups of MIDI devices. FIG. 5 shows one such configuration 501. Each MIDI device 113 has the three connectors: Input 505, output 507, and thru 509. Output 507(*a*) of MIDI device 113(*a*) is connected by MIDI cable 510 to input 505(*b*) of MIDI device 113(*b*), while thru connector 509(*b*) is connected to input 505(*c*) of MIDI device 113(*c*). As a consequence of these connections, the output of MIDI device 113(*a*) is played on both MIDI devices 113(*b*) and 113(*c*); additionally, notes produced by players of devices 113(*b*) and (*c*) will be heard from those devices.

In the MIDI stream, the interval of time between two event messages is simply the amount of time between when the first event message appears in the stream and when the second event message appears in the stream. For this reason, a MIDI stream cannot be stored in or transmitted via a medium which does not preserve the intervals between event messages. The problem of storing a MIDI stream was solved by a special MIDI device 113, MIDI sequencer 511. Sequencer 511 receives one or more MIDI streams 111 and makes MIDI tracks 105 out of the MIDI streams 111 and MIDI files 103 out of the MIDI tracks. The files and tracks are stored in storage devices such as standard memories and/or disk drives.

An important example of a transmission medium that does not preserve the intervals between event messages is the Internet. That is the reason why music produced by MIDI devices has been distributed over the Internet as MIDI files. The techniques used to distribute MIDI files over the Internet are described in the Description of the Prior Art of the parent of the present patent application. As shown in FIG. 1 of the present application, music produced by MIDI devices was distributed over the Internet in the prior art by making a MIDI file 103 from the MIDI stream, distributing the MIDI file over the Internet, and using the arrangement shown at 101 of FIG. 1 to play the file on a MIDI device 113. MIDI file 103 has a header 104 which contains information such as the number of tracks. The MIDI file also contains at least one track 105. A given track i in such a file is indicated hereinafter by 105(*i*). Each track 105(*i*) contains a sequence of events 106. Each event 106(*j*) has two parts: an event message 117 and an elapsed time descriptor 119. The elapsed time descriptor indicates the time that is to elapse between the preceding event 106(*j–l*) and event 106(*j*). As can be seen from the foregoing, a given event 106's position in file 103 may be indicated by the index of its track and its own index in the track. Event 106(*i,j*) is thus event j in track i.

The MIDI stream 111 is generated from MIDI file 103 by MIDI controller 107. Prior-art MIDI controller 107 does this by first writing all of the tracks 105 from file 103 into controller memory 109, as shown by arrow 108, and then reading all of the tracks simultaneously in the fashion just described, as shown by arrow 110. To accomplish the simultaneous reading, MIDI controller 107 maintains a song position time value 121 which the controller can use together with the elapsed time descriptors to determine which event messages are to be output from the tracks at a given time. As would be expected from this procedure, and as shown in FIG. 1, MIDI stream 111 generally consists of interleaved event messages 117 from the tracks 105. MIDI stream 111 may then be responded to by any MIDI device 113, which then drives loudspeaker 115 to produce the sounds specified by MIDI stream 111. The standards for both MIDI streams and MIDI files are defined in the MIDI Specification, copyright 1983 and available from the MIDI Manufacturers' Association.

One large problem with the arrangement of FIG. 1 is that it cannot take a MIDI track as it is being produced from a MIDI stream and make the MIDI track available to users of the Internet. Consequently, the arrangement of FIG. 1 cannot be used to distribute a live concert via the Internet or generally to provide a continuous stream of music via the Internet, or to provide real-time collaboration among musicians via the Internet. It is an object of the invention described herein to solve these problems, as well as other problems that arise when it becomes possible to provide a MIDI track to the Internet as it is produced.

SUMMARY OF THE INVENTION

Aspects of the invention which contribute to solving the problems that the prior art has encountered in distributing MIDI music using non-real-time protocols such as those employed in the Internet include the following:

- employing MIDI tracks in which the time stamps in the events belonging to the track are relative to a single event in the track.
- maintaining a separate store for controller state, so that receivers may begin receiving a track of any length at any point in the track.
- overcoming delays caused by the use of the non-real-time protocols by commencing to play a MIDI track in a receiver only after so much of the track has been received in the receiver that the time required to play the received track is longer than the longest anticipated delay.
- overcoming delays caused by the use of computer systems with non-real-time operating systems to play MIDI tracks by discarding note on event messages that an operating system delay has rendered "too late".
- synchronizing MIDI output produced by a client with MIDI output produced by a server.
- producing a MIDI track from a MIDI stream as the MIDI stream is received and outputting the MIDI track as it is produced to clients in a network.

The foregoing aspects of the invention can be combined in a variety of new network services:

- live performances that produce MIDI streams may be distributed using non-real-time protocols as the performances take place.
- musicians may "play along" with MIDI music received over a network by providing a parameter that indicates what instrument the musician plays. In the MIDI music that the musician receives, that part will be turned off.
- the network can provide endlesss MIDI music which a receiver may begin playing at any point.
- the network may be used as a "distributed sound studio" for making recordings involving MIDI tracks.
- the network may be used for "internet jam sessions" in the same fashion that it is presently used for chat sessions.

The foregoing objects and advantages of the invention will be apparent to those skilled in the arts to which the invention pertains upon perusal of the following Detailed Description and drawing, wherein:

Figure 1:
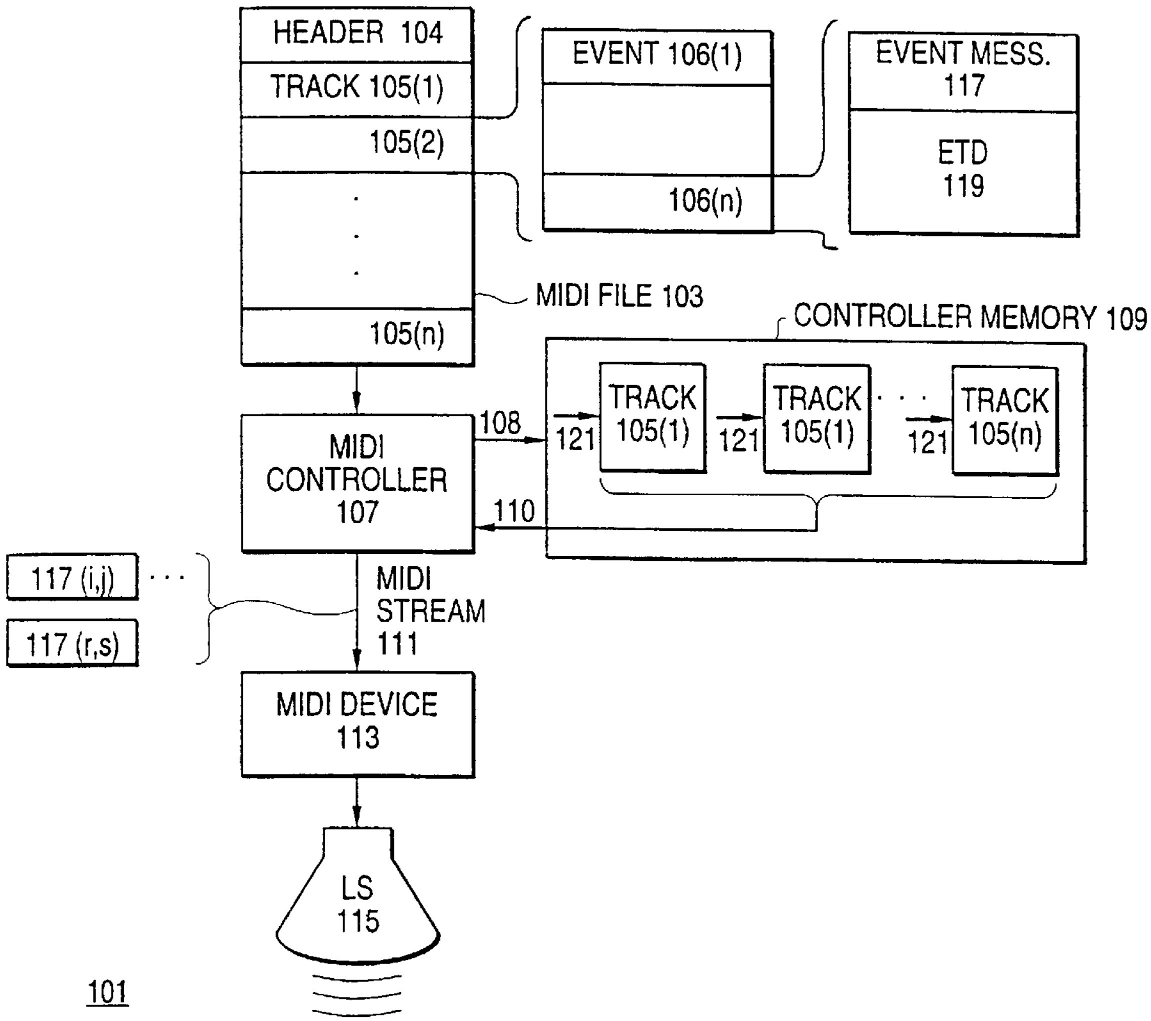
FIG. 1 (PRIOR ART)
FIG. 1 is a block diagram of a prior-art system for playing a MIDI file.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The following Detailed Description contains the entire Detailed Description of the parent of the present application. To this material has been added the material that begins with the section titled Overview of Live MIDI.

The Detailed Description of the parent first describes how MIDI controller 107 may be modified to begin playing a track before the entire track has been received in MIDI controller 107, then describes how MIDI controller 107 may be modified to play a Format 1 MIDI file when all of the MIDI file's tracks have not yet been loaded into controller 107's memory, and finally shows how the invention may be implemented in the environment provided by the Netscape Web browser.

Figure 2:
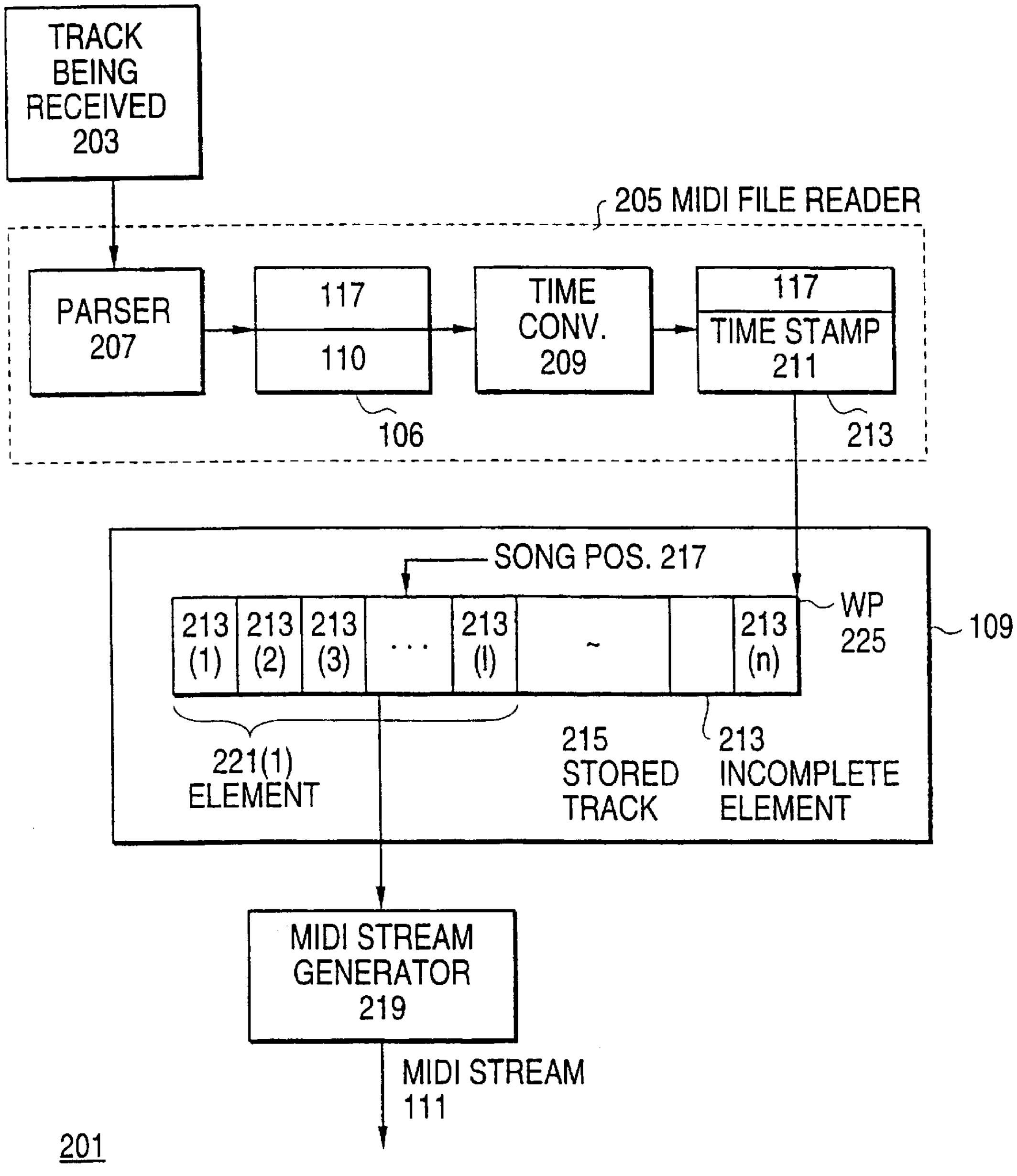
FIG. 2 is a block diagram of modifications to a MIDI controller to permit playing an incomplete track.

Playing a Track While it is Being Received: FIG. 2

FIG. 2 shows how a MIDI controller like that shown at 107 may be modified to begin playing a track of a MIDI file 103 before the entire track has been received in controller 107. Modified controller 201 has two main components: a MIDI file reader 205, which reads the track 203 being received and places information from the track in memory 109, and MIDI stream generator 219, which reads what file reader 205 has placed in memory 109. In contradistinction to prior-art MIDI stream generators, MIDI stream generator 219 does not wait to begin reading until file reader 205 has finished reading all of track 203 into memory 109, but instead operates concurrently with file reader 205. In the preferred embodiment, both file reader 205 and MIDI stream generator 219 are event driven: File reader 205 responds to an event that indicates that the next portion of track 203 has been received in controller 107; whenever the event occurs, file reader 205 runs and places the MIDI events 106 from that portion in memory 109; MIDI stream generator 219 responds to a timer run-out event. That event occurs whenever a timer set by MIDI stream generator 219 runs out. In a preferred embodiment, MIDI stream generator 219 sets the timer to run out after an interval of 2 milliseconds. In general, the shorter the interval, the closer the output stream will approximate the original MIDI stream captured in the MIDI file.

Conceptually, MIDI stream generator 219 keeps track of the last event 106 that it output, the amount of time that has actually elapsed since it began playing the track, and the total amount of time specified by the elapsed time indicators in the events 106 played thus far. Each time the timer expires, MIDI stream generator 219 looks at events 106, beginning with the one following the last event 106 that it output. If the sum of the total elapsed time and the elapsed time indicator for an event is less than or equal to the time that has actually elapsed, MIDI stream generator 219 outputs the event. The intervals at which the timer runs out are short enough so that the intervals separating the event messages in MIDI stream 111 are substantially those specified in the elapsed time descriptors 119. Since file reader 205 generally receives track 203 much more rapidly than MIDI stream generator 219 reads it, MIDI stream generator 219 can play track 203 as it is loaded.

Continuing in more detail, MIDI file reader 205 includes two subcomponents that are important for the present discussion: parser 207 and time converter 209. Parser 207 reads events 106 in order from track 203. Each event 106 of course includes event message 117 and elapsed time descriptor 119. As an event is read, it is passed to time converter 209, which converts elapsed time descriptor 119 to time stamp 211. As previously described, elapsed time descriptor 119 specifies the time elapsed since the last event message 117; time stamp 211 contains the sum of the elapsed times in all of the time descriptors 119 from the beginning of track 203 to the current event 106. The result of this operation is an event 213, which is then added to stored track 215 in memory 109. The point at which the next event is to be added is specified by write pointer (WP) 225. Elapsed time descriptor 119 is converted to time stamp 211 in the preferred embodiment in order to simplify the computations performed by MIDI stream generator 219 in determining whether an event is to be output to MIDI stream 111. In a preferred embodiment, stored track 215 is subdivided into elements 221. When MIDI file reader 205 begins reading events 106 from file 203, it allocates an element 221; it places events 106 in the element until it is full and then allocates another element. All elements but the last to be allocated are full, and consequently, MIDI stream generator 219 can detect when it is approaching the end of stored track 215 currently being written by the presence of an incomplete element 223. In the preferred embodiment, an incomplete element 223 is one for which write pointer 225 is not at the end of the element.

MIDI stream generator 219 generates MIDI stream 111 from stored track 215 as follows: Each time the timer expires, do the following:

1. Determine how much time has actually elapsed since MIDI stream generator 219 has begun playing the track; this is the current song position, indicated in FIG. 2 as SongPos 217.
2. Beginning with the event 213 following the last event to be played, output event messages 117 until either an event 213 is reached whose time stamp is greater than SongPos 217 or one is reached that is in an incomplete element 223.
3. At that point, set the timer and wait for it to expire again.

Figure 3:
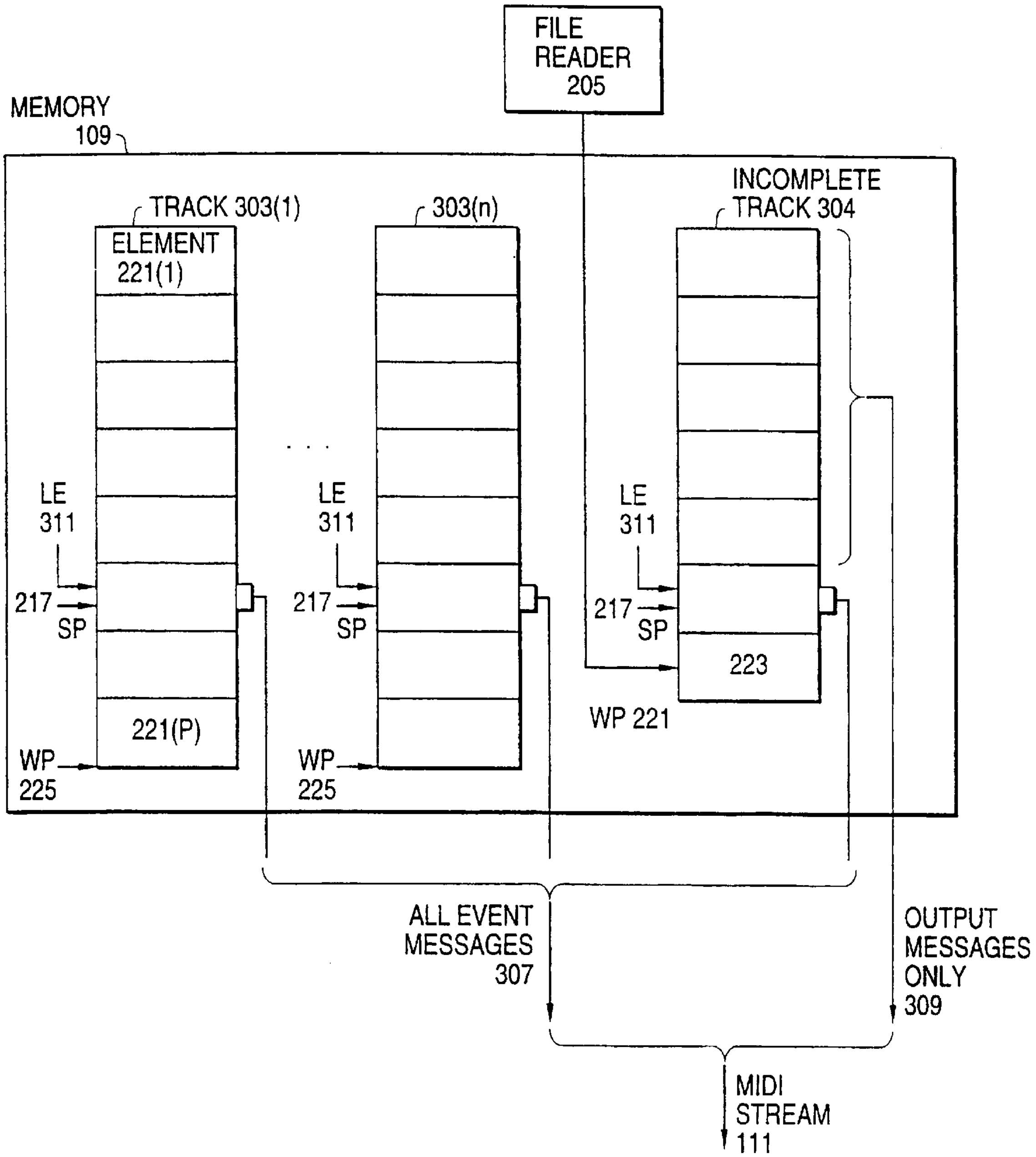
FIG. 3 is a block diagram of a further modification to a MIDI controller to permit playing a multi-tracked MIDI file with an incomplete track.

Playing Multi-Tracked MIDI Files as They are Received: FIG. 3

The technique just described is sufficient for playing MIDI files with only one track, such as Format 0 MIDI files or Format 1 Midi files with only one track. With multi-track files, it is also necessary to solve the problems resulting from the fact that MIDI stream generator 219 plays each track at the position determined by SongPos 217 and must therefore be able to begin playing tracks other than the first track to be received "in the middle". Starting in the middle is complicated by the fact that how a MIDI device responds to a note on or note off event message is determined not only by the message, but also by control event messages which preceded the note on or note off message in MIDI stream 111.

FIG. 3 shows how file reader 205 writes the tracks it receives into memory 109 and how MIDI stream generator 219 reads the tracks. File reader 205 receives the tracks sequentially, and as it receives each track, it writes the track to memory 109 as described with regard to FIG. 2 above. As a result, the tracks appear as shown in FIG. 3. File reader 205 has already read tracks 105(1) through 105(n−1) into memory as stored tracks 301(1) through 303(n−1). That these tracks are complete is indicated by the fact that the track's write pointer 225 is at the end of the last element. File reader 205 is presently reading track **105(*n*) and has stored the portion it has read in incomplete stored track 304. Each track 303 is made up of a sequence of elements 221, with the last element in track 304 being an incomplete element 223 to which file reader 205 is still writing events 213**.

MIDI stream generator 219 begins generating MIDI stream 111 from track 303(1) as soon as file reader 205 has written the first complete element 221 to the file. In other embodiments, MIDI stream generator 219 may begin reading even before the first complete element has been written. Of course, at this point, MIDI stream 111 contains only event messages from track 303(1), and consequently, the MIDI device that is responding to stream 111 plays only the part contained in track 303(1). For example, if that track contains the percussion part, that is the first part that the responding device plays. As soon as file reader 205 has written enough of track 303(2) that SongPos 217 specifies a location in a completely-written element 221, MIDI stream generator 219 begins generating MIDI stream 111 from track 303(2) as well, and so on, until file reader 205 has written the last track past the location currently represented by SongPos 217. At that point, MIDI stream 111 is being generated from all of the tracks 303 and 304.

As heard by the listener, the music begins with the part contained in the first track to be received; as each track is received, the part contained in the track is added, until the listener finally hears all of the parts together. This incremental addition of parts has an effect which is similar to the incremental increase in definition that is often employed when a graphics element is displayed on a Web page. The user begins seeing the graphics element or hearing the music with minimum delay and can often even decide on the basis of the low-definition display of the graphics element or the rendering of the music with fewer than all of the parts whether he or she has any further interest in the graphics element or the music.

MIDI stream generator 219 generates MIDI stream 111 from complete tracks 303 (1 . . . n) and incomplete track 304 as follows:

Each time the timer expires, do the following:

1. For each track, determine how much time has actually elapsed since MIDI stream generator 219 has begun playing the track; this is the current song position, indicated in FIG. 2 as SongPos 217.
2. In each complete track 303, beginning with the event 213 following the last event to be played, output event messages 117 until an event 213 is reached whose time stamp is greater than or equal to SongPos 217.
3. In incomplete track 304,
   a. do nothing if the current position indicated by SongPos 217 is beyond the last complete element 221 in incomplete track 304.
   b. Otherwise,
      i. If this is the first time event messages 117 have been output from incomplete track 304, begin at the top of track 304 and output only the control event messages until SongPos 217 is reached.
      ii. After the first time, treat incomplete track 304 in the same fashion as complete tracks 303.

Set the timer and wait for it to expire again.

Outputting the control event messages but not the note on or note off messages from the beginning of incomplete track 304 to SongPos 215 the first time event messages are output from incomplete track 304 ensures that the MIDI device which plays MIDI stream 111 will have received all of the control messages it needs when it plays the note on or note off events output between last event 311 and SongPos 217. Any technique which achieves the same purpose may be employed instead of the one just described. For example, in other embodiments, MIDI stream generator 219 may search back through the track until it has found all of the control event messages relevant to the current position of SongPos 217 and then output only those control event messages before beginning to output note on or note off event messages.

The foregoing appears in FIG. 3 as arrow 307, showing how in all tracks from which event messages have already been output, all event messages between last event 311 in the track and SongPos 217 are output to MIDI stream 111, and arrow 309, showing how the first time event messages are output from incomplete track 304, only the control event messages are output from the top of incomplete track 304 through SongPos 217.

Figure 4:
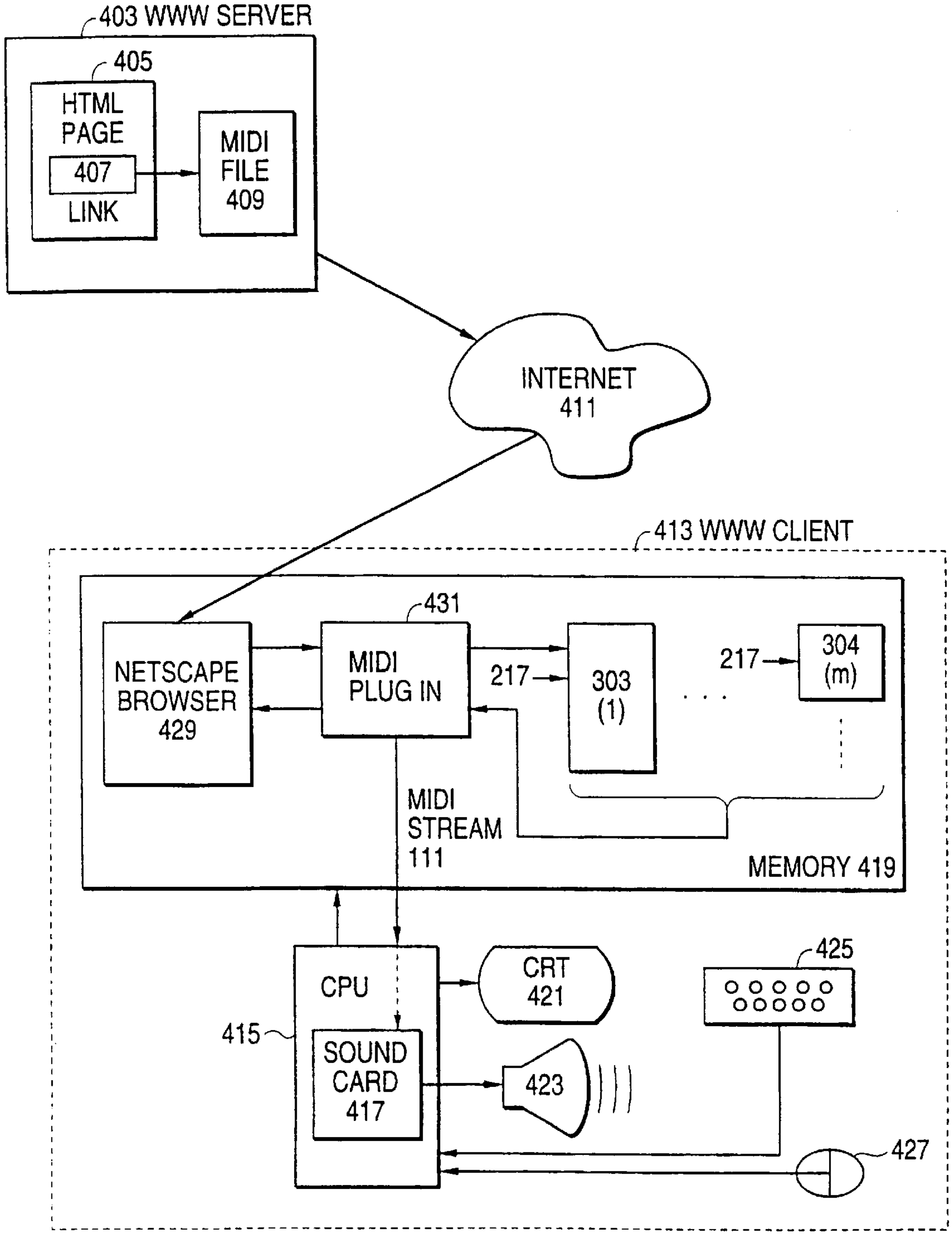
FIG. 4 is a block diagram of an embodiment of the invention for use with a World Wide Web browser

Incorporating the Invention into a Web Page Browser: FIG. 4

As indicated above, one application in which the invention's ability to begin playing before a complete MIDI file has been received by the MIDI controller is particularly valuable is where the MIDI file is being transferred via the Internet, either as an inclusion in a Web page which has been downloaded by a user or as a file that is referred to by a link in a Web page. In such applications, the most natural place to implement the invention is in a World Wide Web browser.

FIG. 4 shows a presently-preferred implementation of the invention in a Netscape browser. System 401 includes a World Wide Web server 403 which serves pages 405 written in the HTML language via Internet 411 to a World Wide Window client 413. An HTML page 405 may include a link 407 to a MIDI file 409. Client 413 may be implemented in any kind of computer system, but client 413 is implemented in FIG. 4 in a standard PC. The PC has a memory 419, a processor 415 which includes a sound card 417 which is a MIDI device, and peripheral devices including a CRT display 421, a loudspeaker 423 which is connected to sound card 417, keyboard 425, and mouse 427. The program which causes the PC to function as a World Wide Web client 413 is Netscape browser 429, which responds to an input of a Universal Resource Locator (URL) specifying an HTML page 405 in a particular server 403 by first executing a protocol which retrieves the page 405 from server 403 and then interprets the page to produce a display in CRT 421 of the type specified by HTML page 405.

A given HTML page may have non-HTML inclusions such as pages written in different mark up languages, files containing vector graphics, compressed video, sound files, or MIDI files. If a browser includes the software to respond to such a file, the browser will display or play the file; otherwise, it will just display the surrounding HTML. Given the pace at which Web technology is changing and the varying needs of users of browsers, providing the software needed to read inclusions has become a problem for manufacturers of browsers. Netscape Communications Corporation has addressed this problem by making it easy for third parties to write software which can be used by Netscape browsers to read inclusions. Such software is termed by the art a "plugin".

Figure 6:
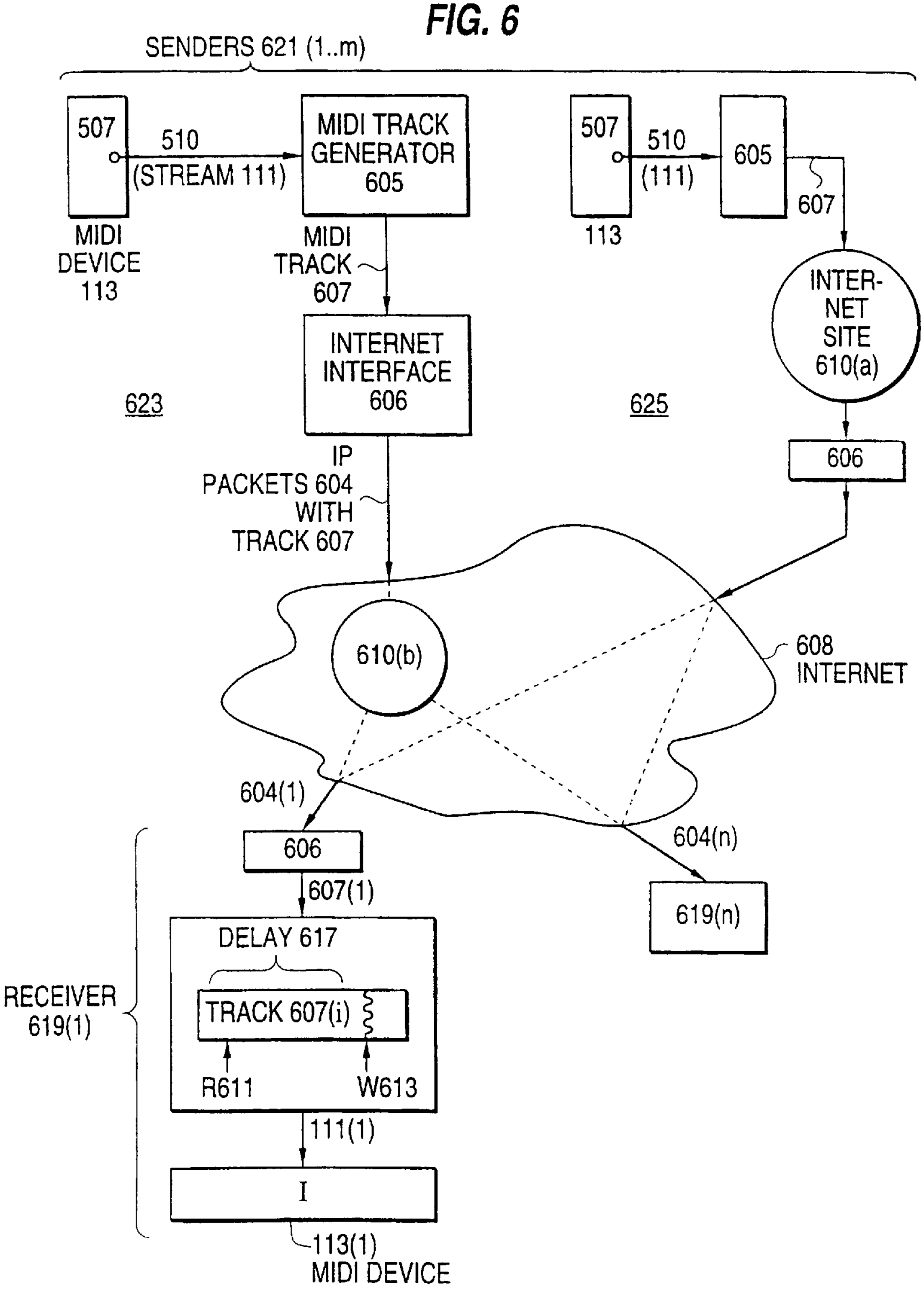
FIG. 6 is an overview of a technique for transmitting a live performance on a MIDI device via the Internet.

A MIDI plugin incorporating the invention is shown at 431 in FIG. 4. A user of a Netscape browser 429 can use his browser to download a desired plugin from the Internet, and after the browser has downloaded the plugin, the user can place it in a directory in which browser 429 looks for plugins. When browser 429 receives an inclusion of the type read by the plugin, the browser activates the plugin. The plugin uses browser 429's facilities to fetch the inclusion and then reads or plays the inclusion. As shown in FIG. 4, a MIDI plugin 431 which incorporates the invention performs substantially the same tasks as a MIDI controller which incorporates the invention. Plugin 431 has a file reader 205 and a MIDI stream generator 219. File reader 205 reads MIDI file 409 serially as it is received in browser 429 and outputs events 213 to memory 419. File reader 205 includes a parser 207 which reads events 106 and a time converter 209 which converts elapsed time descriptors 119 to time stamps 211 and thereby produces events 213. As this process goes on, one or more tracks 303 are written to memory 419, with file reader continuing to write to the end of the track that is currently being received in browser 429. Meanwhile, MIDI stream generator 219 operates as just described to generate MIDI stream 111 from tracks 303 and 304. The event messages go to sound card 417, which drives PC loudspeaker 423. Netscape Communications Corporation has defined an Application Programmer's Interface (API) for plugins for the Netscape browser. A detailed description of plugins for the Netscape browser and of the Application Programmer's Interface could be found in September, 1996 at the URL http://home.netscape.com/eng/mozilla/3.0/handbook/plugins/pguide.htm Overview of Live MIDI: FIG. 6

The Detailed Description of a preferred embodiment of the invention of the present patent application begins with an overview of the invention and then provides more detailed disclosure of the components of the preferred embodiment.

What is termed herein live MIDI is the distribution of a MIDI track from a server to one or more clients using a non-real-time protocol and the playing of the MIDI track by the clients as the track is being distributed. One use of live MIDI is to "broadcast" recitals given on MIDI devices as they occur. In this use, the MIDI stream produced during the recital is transformed into a MIDI track as it is being produced and the MIDI track is distributed to the clients, again as it is produced, so that the clients are able to play the MIDI track as the MIDI stream is produced during the recital. The techniques used to implement live MIDI are related to techniques disclosed in the parent of the present patent application for reading a MIDI track 105 as it is received. These techniques, and related techniques for generating a MIDI track from a MIDI stream as the MIDI stream is received in a MIDI sequencer are employed to receive the MIDI stream, produce a MIDI track from it, distribute the track using the non-real-time protocol, and play the track as it is received to produce a MIDI stream. The varying delays characteristic of transmissions employing non real-time protocols are dealt with by waiting to begin playing the track in the client until enough of the track has been received that the time required to play the received track will be longer than the greatest delay anticipated in the transmission. Other aspects of the techniques permit a listener to begin listening to the track at points other than the beginning of the track, permit the distribution of an essentially endless track, and permit use of the non-real-time protocol for real-time collaboration among musicians playing MIDI devices.

FIG. 6 shows a system 601 that embodies the principles of the invention. FIG. 6 has three main components: one or more senders 621 (1 . . . m) which are sources of MIDI streams 111, Internet sites 610(*a* and *b*) that are connected via Internet 608 to senders 621, and one or more receivers 619(1 . . . n), which have established connections with Internet sites 610 to receive a MIDI track 607 made from MIDI stream 111 and produce a MIDI stream 111 from track 607.

Continuing in more detail with senders 621, two kinds of such senders are shown. Components 113 and 605 are identical for both. In both senders, a MIDI device 113 produces a MIDI stream 111 and provides it to a MIDI track generator 605. MIDI track generator 605 generates a MIDI track 607 from MIDI stream 111. MIDI track 607 is like MIDI track 215 of the parent patent application in that track 607 is a sequence of events 213. Each event 213 contains a MIDI event message 117 and a time stamp 211 which indicates the length of time between the beginning of the MIDI stream being recorded in the track and the occurrence of the event message 117 contained in the event.

The difference between sender 613 and sender 625 lies in their relationship to Internet 608. Sender 623 has access to Internet 608 but is not itself a site 610 in Internet 608, that is, other participants in Internet 608 cannot use an Internet browser to establish a connection with Sender 623. Sender 625 is itself a site 610(*a*) in Internet 608. Beginning with sender 613, since sender 613 is not itself a site in Internet 608, it must send track 607 to such a site, in this case, site 610(*b*). It does so by sending track 607 to Internet interface 606, which has established a TCP session with Internet site 610(*a*) and outputs track 607 as a sequence of packets 604 addressed to Internet site 610(*a*). The packets satisfy the IP protocol. The TCP session cannot guarantee that Internet site 610 will receive a given packet at any given time or indeed receive it at all, or that it will receive a given sequence of packets in any particular order, but it can guarantee that Internet site 610 and sender 621 can detect lost or damaged packets and can also request that a lost or damaged packet be resent. The protocols thus provide an environment in which all packets sent via a given session eventually arrive.

Receivers 619 who wish to hear the stream 111 produced by sender 623 establish a connection via Internet 608 with Internet site 610(*b*). As Internet site 610(*b*) receives packets 604, it reads the data from them to produce a copy of MIDI track 607 in Internet site 610(*b*). It then provides the events in the copy of MIDI track 607 in the order in which they occur in the track to each of receivers 619. It does so via the Internet, and consequently, the events must be incorporated into packets destined to the various receivers 619. As will be pointed out in more detail below, a receiver 619 may begin receiving track 607 from Internet site 610 at any time after Internet site 610 has itself begun to receive it.

In the case of sender 625, that sender itself includes Internet site 610(*a*), so that receivers 619 are able to establish a connection via Internet 608 directly with sender 625. In this case, Internet interface 606 is between site 610(*a*) and the remainder of the Internet. Which of the arrangements of senders 621 is to be preferred is determined by circumstances; where there are relatively few receivers 619, the resources available in a Web site belonging to a sender 621 may be sufficient to serve them all; where there are many receivers 619, a powerful Internet site owned by a party such as a publisher for MIDI music may be required.

Each receiver 619 includes an Internet interface 606 for receiving IP packets 604 according to the TCP protocol and outputting track 607, a track-stream transformer 612 for transforming track 607 back into a MIDI stream 111, and a MIDI device 113 which can respond to stream 111. Track stream transformer 612 works generally in the same fashion as apparatus 201 of the parent application. Track 607 received at receiver 619 is identical to track 607 generated by MIDI track generator 605, but is received in receiver 619 with a delay which is dependent upon the path(s) in Internet 608 by which the packets 604 carrying track 607 are sent to receiver 619 and upon the condition of the Internet nodes and links on those paths. The delay will generally be different for each receiver 619. This fact is indicated in FIG. 6 by assigning the index of receiver 619 to the packets 604 it receives, the track 607 received via the packets, and the MIDI stream produced by transformer 612. A receiver may be implemented as software executing on a processor. The processor may be in a PC, or may be in a specialized audio device. The software may be an independent module or it may be implemented as part of an Internet browser. In the latter case, it is particularly advantageous to implement the software as a plugin for the browser.

If the delay were constant, it would be possible to start generating MIDI stream 111(1) in receiver 619(1) from track 607(1) as soon as the first event in track 607(1) began arriving in track-stream transformer 612. The delay varies, however, and consequently, if that were done and the delay increased, track-stream transformer 612 could run out of track 607 from which to generate stream 111. To prevent this, the preferred embodiment waits to begin playing track 607 until enough of track 607 has accumulated in receiver 619 that playing the accumulated track will require a period longer than the greatest anticipated delay. This portion of the track appears as delay 617 in FIG. 6. In a preferred embodiment, the amount of track 607 that must be accumulated before receiver 619 begins playing the track is determined by a delay parameter set by the user of receiver 619(1); in other embodiments, Internet site 610 may use information that it has about the behavior of Internet 608 to provide a delay parameter to receiver 619(1) when receiver 619(1) establishes the connection with Internet site 610 over which track 607(1) is to be received. It should be pointed out here that the technique for dealing with transmission delay can also be used in playing MIDI tracks in the manner described in the parent of the present patent application.

Figure 7:
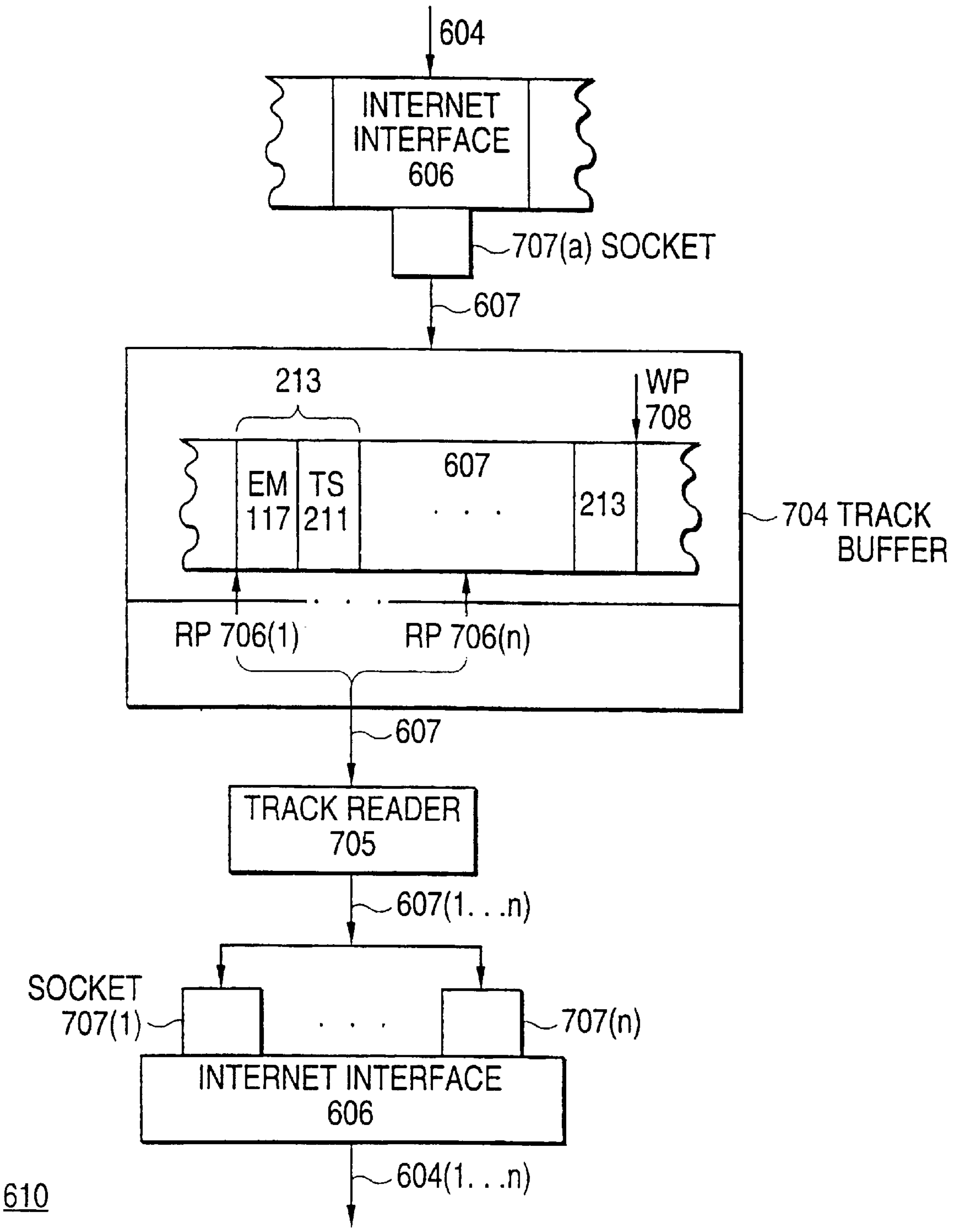
FIG. 7 is a detail of a technique for distributing a MIDI track over the Internet as the track is created.

Details of MIDI Track Generator 605 and Internet Site 610: FIG. 7

In a preferred embodiment, MIDI track generator 605 is implemented using the portion of a MIDI sequencer which generates a MIDI file from MIDI stream 111. That portion has been modified in two respects:

1. The MIDI track 607 generated by MIDI track generator 605 is not a standard MIDI track, 105 with elapsed time descriptors 119. Instead, it is a MIDI track like stored track 215 of the parent. In track 607, the elapsed time descriptors are replaced by time stamps 211. Each time stamp indicates the time that has elapsed between the time the first event message in the track was received in MIDI track generator 605 and the time the current event message was received. The time stamps thus give times relative to the beginning of the MIDI stream represented by track 607.
2. Instead of outputting track 607 to a file in the sequencer's memory as the track is created, it outputs track 607 to Internet interface 606 or to Internet site 610(*a*) as it is created.

Details of Internet site 610(*b*) are shown in FIG. 7. Internet site 610(*b*) receives and transmits information via sockets 707 in Internet interface 604. Each session with an entity to which or from which site 610 is receiving data has a socket 707. There are thus in FIG. 7 a socket 707(*a*) for the session with sender 621 and sockets 707(1 . . . n) for the receivers 619(1 . . . n). In the case of socket 707(*a*), the socket receives IP packets 604 from MIDI track generator 605 and produces therefrom data which contains MIDI track 607. The track data is stored in track buffer 704. As shown in FIG. 7, track 607 is made up of a sequence of event messages 117 and time stamps 211. A write pointer 705 indicates the point at which data from socket 707 is currently being written to track 607.

Track 607 is read as it is written by track reader 705. Track reader 705 maintains a read pointer 706 in track 607 for each receiver 619. FIG. 7 thus shows read pointers 706(1 . . . n). Of course, a number of the read pointers may point to the same position in track 607. As track reader 705 reads track 607 for a given receiver 619(*i*), it sends a portion of the track at the current position of read pointer 706(*i*) to socket 707(*i*) and updates pointer 706(*i*) to point to the next portion to be read for that client 619(*i*). If a read pointer 706(*i*) reaches the position of write pointer 708, track reader 705 simply stops sending portions of track 607 to receiver 619(*i*) until further portions of track 607 have been received in Internet site 610 and write pointer 708 has been updated accordingly.

Figure 8:
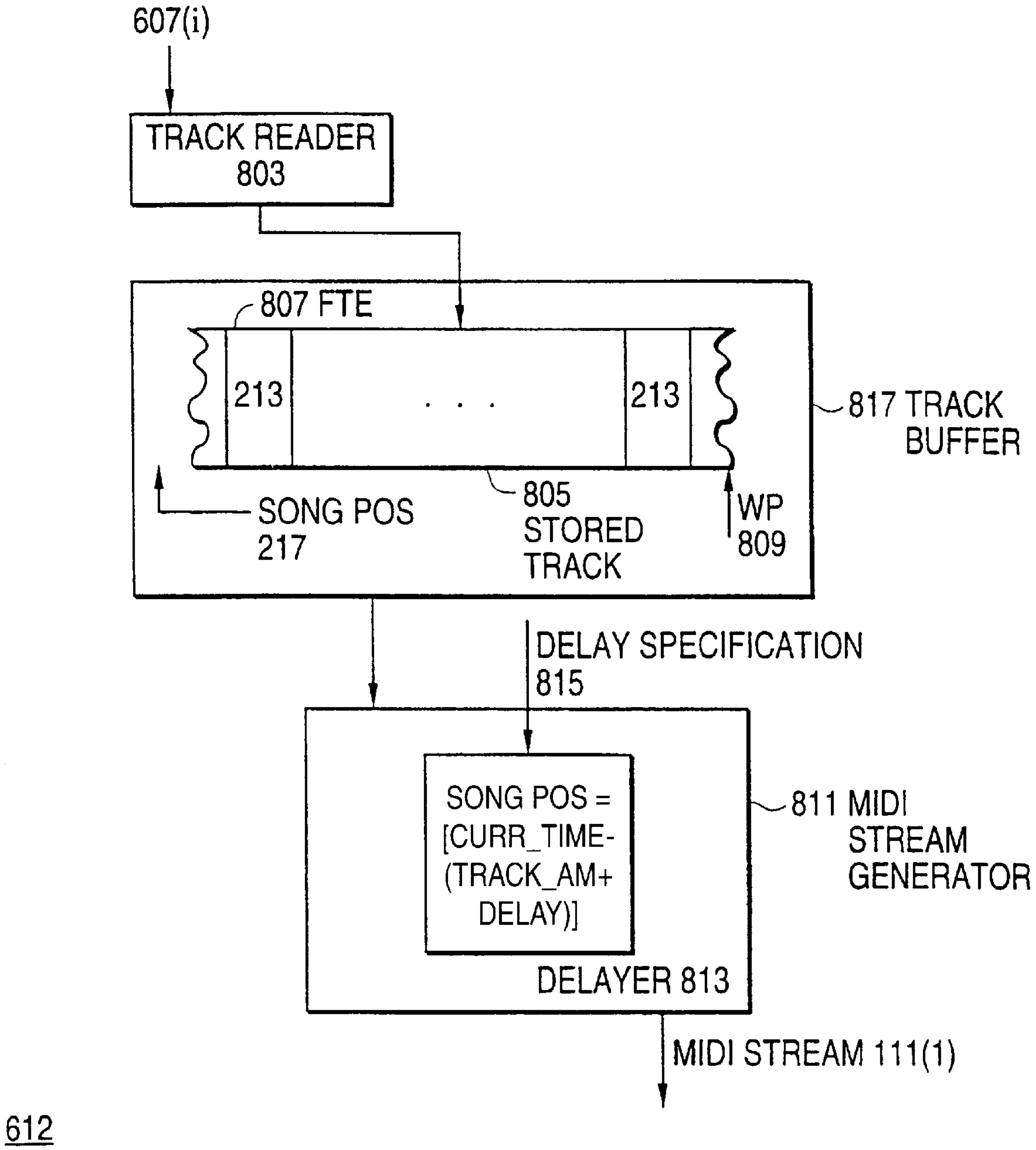
FIG. 8 is a detail of a technique for reading the track as it is received.

Details of Track-stream Transformer 612: FIG. 8

Track-stream transformer 612 is a variation on apparatus 201 of the parent patent application. Track reader 803 receives track 607(*i*) and parses it as it is received to obtain events 213; however, track 607(*i*) already contains time stamps 211, so there is no need to convert elapsed time stamps to time descriptors. The events are written to track buffer 817 in memory 109 to form stored track 805. The event currently being written is indicated by write pointer 809. MIDI stream generator 811 reads stored track 805 as explained for MIDI stream generator 219. MIDI stream generator 811, however, delays beginning to read stored track 805 until enough of stored track has accumulated to require the delay period to play.

In the preferred embodiment, the delay period is implemented as follows: first a server start time is determined which is the system time at which receiver 619 creates the buffer in which stored track 805 is stored. The delay period is then added to the server start time to obtain a play start time. Beginning at the start of stored track 805, the time stamp of each event is added to the server start time and subtracted from the play start time. If the result is negative, the amount of stored track 805 from that event to the beginning of the track is not enough to fill out the delay period. If the result is 0 or positive, there is enough of stored track 805 to fill out the delay period and receiver 619 can start playing the track from the beginning.

Because MIDI track 607 requires so little space to represent music, the first sequence of events to be received in receiver 619 often contains enough events to fill out the delay period, and receiver 619 can begin playing stored track 805 immediately. The portion of the code for MIDI stream generator 811 which executes this algorithm appears in FIG. 8 as delayer 813. As shown there, the amount of delay is received as a delay specification parameter 815 in delayer 813. In the preferred embodiment, the user of receiver 619(*i*) provides parameter 815; however, in other embodiments, it may be provided by Internet site 610 as described above or a combination of the techniques may be employed. For example, a default delay may be provided by Internet site 610 and the user may provide a delay parameter which overrides the default delay.

When a receiver 619 is implemented in a system which does not have a real-time operating system, for example, a system which employs an operating system such as Windows 95, the operating system can introduce an element of delay in the operation of MIDI stream generator 811. The delay occurs when the interval between reads of stored track 805 becomes longer than the 2 millisecond interval of the preferred embodiment. This problem is dealt with in the preferred embodiment by means of a MAX_JITTER parameter which specifies a maximum amount of time by which the time stamp 211 of an event 213 that specifies a note-on message may indicate a time that precedes the time represented by SongPos 217. If the time stamp of such an event exceeds MAX_JITTER, the event is not output to MIDI stream 111, thereby effectively dropping the note from the stream. Note off event messages and control event messages are, however, always output.

Figure 11:
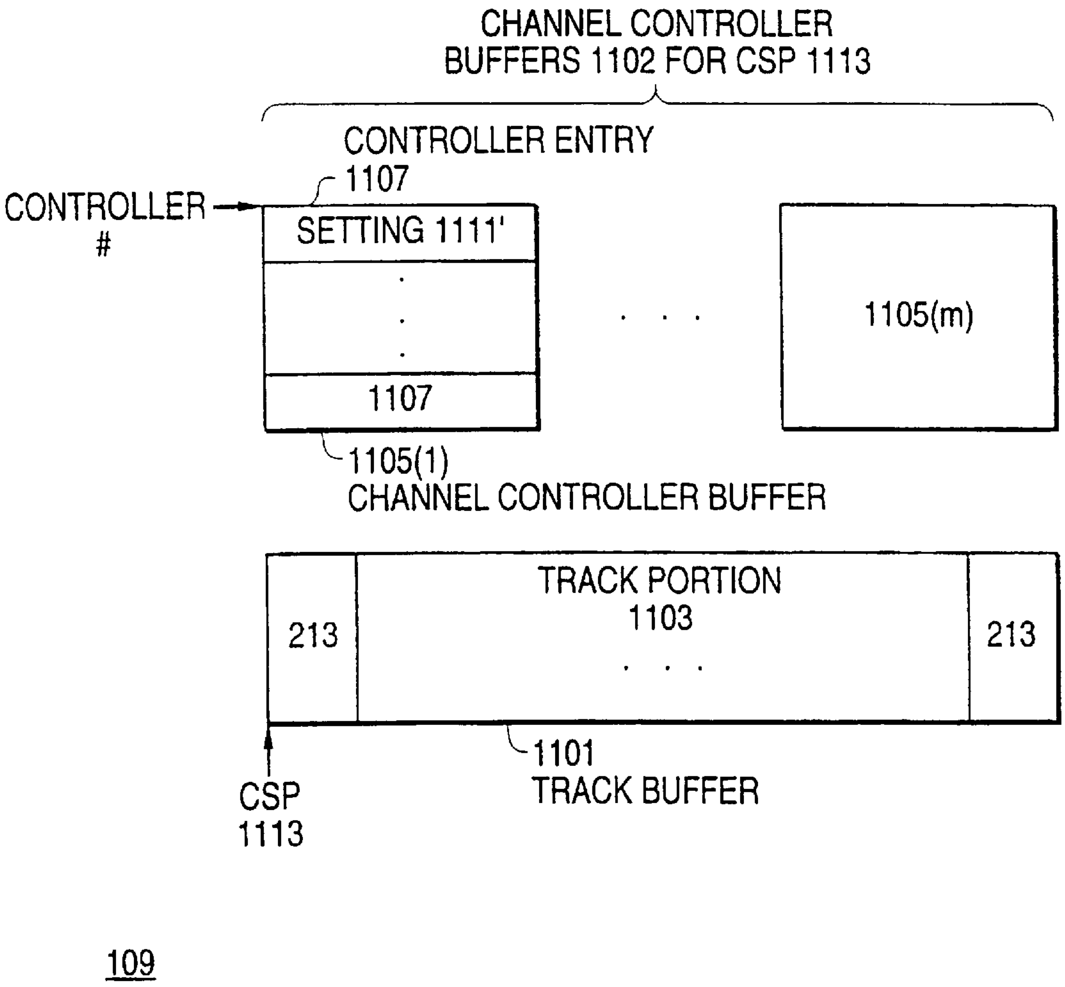
FIG. 11 is a detail of stored track 805 with an improvement which makes it possible to distribute an endless MIDI track.

Separate Storage of Control State in System 601: FIG. 11

As described thus far, the live MIDI system has one drawback: receiver 619 must receive all of the track 607 that Internet site 610 has received. The reason for this is that the meaning of any given point in MIDI stream 111 is potentially determined by all of the control event messages and note off event messages which preceded that point in the stream. A receiver 619(*i*) may begin listening in the middle of track 607(*i*), but when it does so, track-stream transformer 612 must go to the beginning of track 607(*i*) and output all of the control event messages from the beginning up to the point where the listening is to begin to MIDI stream 111(*i*). That in turn means that the buffer in which track 805 is stored must be large enough to store the entire track 607. The same is of course true for track buffer 704 in Internet site 610.

There are several ways in which this difficulty can be dealt with. They all take advantage of the fact that most of MIDI stream 111 is made up of note on and note off event messages. One way, which still requires that all of the track that has been received so far is stored in Internet site 610, is to set up track reader 705 so that when a receiver 619 establishes a connection with a concert or recital that is already in progress, track reader 705 reads track 607 from the beginning and sends all of the control event messages that precede the current point in track 607 to the newly-joined receiver, but only begins sending on and/or off event messages when that point is reached. This technique is thus a modification of the one used in the parent of the present patent application to start outputting a MIDI stream from the middle of a MIDI track.

Another way of dealing with the difficulty which does not require that all of track 607 be stored in Internet site 607 is to make a separate control event buffer which contains only control event messages, but which can be made large enough to contain all of the control event messages from even the longest track 607. Track 607 continues to contain both control event messages and on-off event messages as before, but since the control event buffer will contain all of the control event messages received thus far in track 607, it is no longer necessary for track buffer 704 to contain all of track 607 that has been thus far received. When a new receiver 619 establishes a connection to Internet site 610, track reader 705 first outputs all of the event messages in the control event buffer to the new receiver and then begins outputting the entire track 607. This approach is also advantageous in that track reader 705 need only scan the relatively small control buffer from the beginning rather than the much larger complete track 607.

A third solution to the problem is shown in FIG. 11. This solution takes advantage of the fact that the only event messages that are really required to start reading track 607 in the middle are controller event messages. These messages specify settings of control devices on the MIDI devices which respond to the messages. Which MIDI devices respond is of course determined by the channel specified in the message. All of the controller event messages contain three bytes. The first byte specifies a channel number and a controller event message type, the second specifies the number of the controller, and the third specifies the setting of the controller. As can be seen from this, a given channel can have a maximum of 128 controllers, and the settings for a given controller can range from 0–127. The settings are furthermore absolute, and not relative to an earlier setting of the controller.

In the following, the current state of all of the controllers relevant to a given point in a track 607 will be termed the controller state of that point in track 607. The given point is specified by the value in time stamp 211 of the event 213 at that point in the track. One way of establishing the controller state of a given point in a track 607 is to simply transmit all of the control event messages from the beginning of track 607 up to the given point. Another way is shown in FIG. 11. There, the controller state of a given controller state point 1113 in a given portion 1103 of track 607 is represented by means of a set of controller state buffers 1102 corresponding to the controller state point 1113. There is a controller state buffer 1105(*i*) for each channel that is relevant at point 1113. Each buffer 1105(*i*) has 128 entries, one for each possible controller for the channel, and the entry for a given controller contains the setting for the controller at control state point 1113.

Given the controller state for a given controller state point 1113, Track reader 705 is able to generate the corresponding controller event messages and output them to MIDI stream 111. Track reader 705 can thus start reading track 805 at any point following a controller state point 1113. To start reading, Track reader 705 backs up to controller state point 1113, generates the controller event messages from the channel controller buffers 1102 for controller state point 1113, then outputs only control event messages up to the point at which reading is to begin, and at that point begins outputting all of the event messages in track portion 1103. The controller state buffers could of course also be sent to track-stream transformer 612 in receiver 619 when the connection with Internet site 610 is established and the controller event messages generated there. It seems more reasonable, though, to keep transformer 612 a simple reader of tracks and implement more complicated functions in Internet site 610.

Channel controller buffers 1102 must of course be kept current. One way to do this is to update buffers 1102 each time a new controller event message comes in and at the same time update controller state point 1113 to contain the timestamp for the latest controller event message. Another way to do it is to begin building a new set of channel control buffers 1102 at the point following the controller state point 1113 for the set of buffers 1102 currently being used and periodically merge the contents of the old and new buffers. Again, controller state point 1113 would be updated to reflect the position of the controller state buffers that are currently in use. In any case, the first set of channel controller buffers 1102 is of course set from the controller event messages that are sent prior to the beginning of a song.

With the foregoing arrangement, there is no longer any relationship whatever between the length of track 607 and the sizes of the buffers required to store track 607 in Internet site 610 or receiver 619. Moreover, MIDI track 607 may be endless. In such an endless track 607, it will be at most necessary to occasionally reset a timestamp value to 0 and recompute following timestamp values relative to the reset value. One use of such an endless MIDI track 607 is to provide background music; another use is to provide a site in the Internet at which musicians can come and go as participants in an endless jam session. This latter possibility will be explored in more detail below.

Making Music Using Live MIDI

Figure 5:
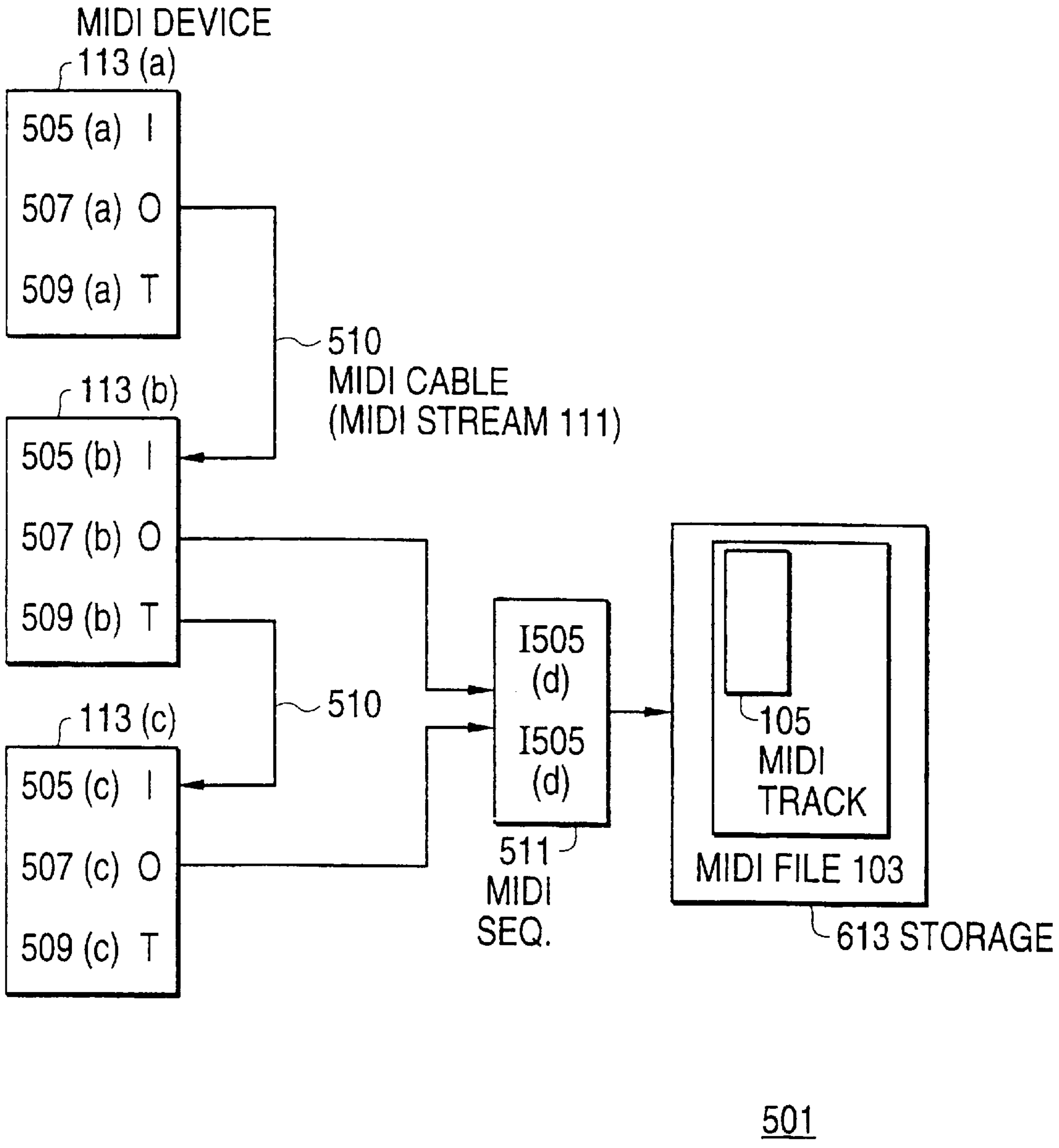
FIG. 5 (PRIOR ART)
FIG. 5 is a prior-art configuration of MIDI devices.

The techniques involved in live MIDI can also be used for participatory music making. If the MIDI device 113 in receiver 619 is a MIDI electronic instrument and the MIDI stream is output to the device's input connector, the electronic instrument will interpret the stream; while it is doing that, the user may use another input to the electronic instrument to play along. The arrangement would have the same effect as far as the MIDI stream is concerned as the connection between MIDI device 113(*a*) and 113(*b*) in FIG. 5. Another variation would be to additionally connect another MIDI device 113 to the first one by connecting the thru connector of the first device to the in connector of the other device, as is shown in the connection between device 113(*b*) and 113(*c*) in FIG. 5. This could be used where it is desired to play the stream on different types of MIDI instruments. Of course, people could play along on either instrument.

A refinement of playing along is the following: if a channel is assigned to each of the electronic instruments in an ensemble piece, Internet site 610 can indicate to a user who wishes to play along what channels correspond to what instruments, and a player of a given kind of instrument can provide a parameter to track-stream transformer 612 which indicates that track-stream transformer 612 is not to output event messages for that instrument's channel to MIDI stream 111. The player can then play along with the MIDI stream produced from the remaining channels. In other embodiments, the channel parameter could be provided to Internet site 610, which would then remove such events for the channel from track 607 sent to receiver 619 that provided the channel parameter. It should be noted here that this technique can also be employed when a MIDI device is being played from a MIDI file.

Figure 9:
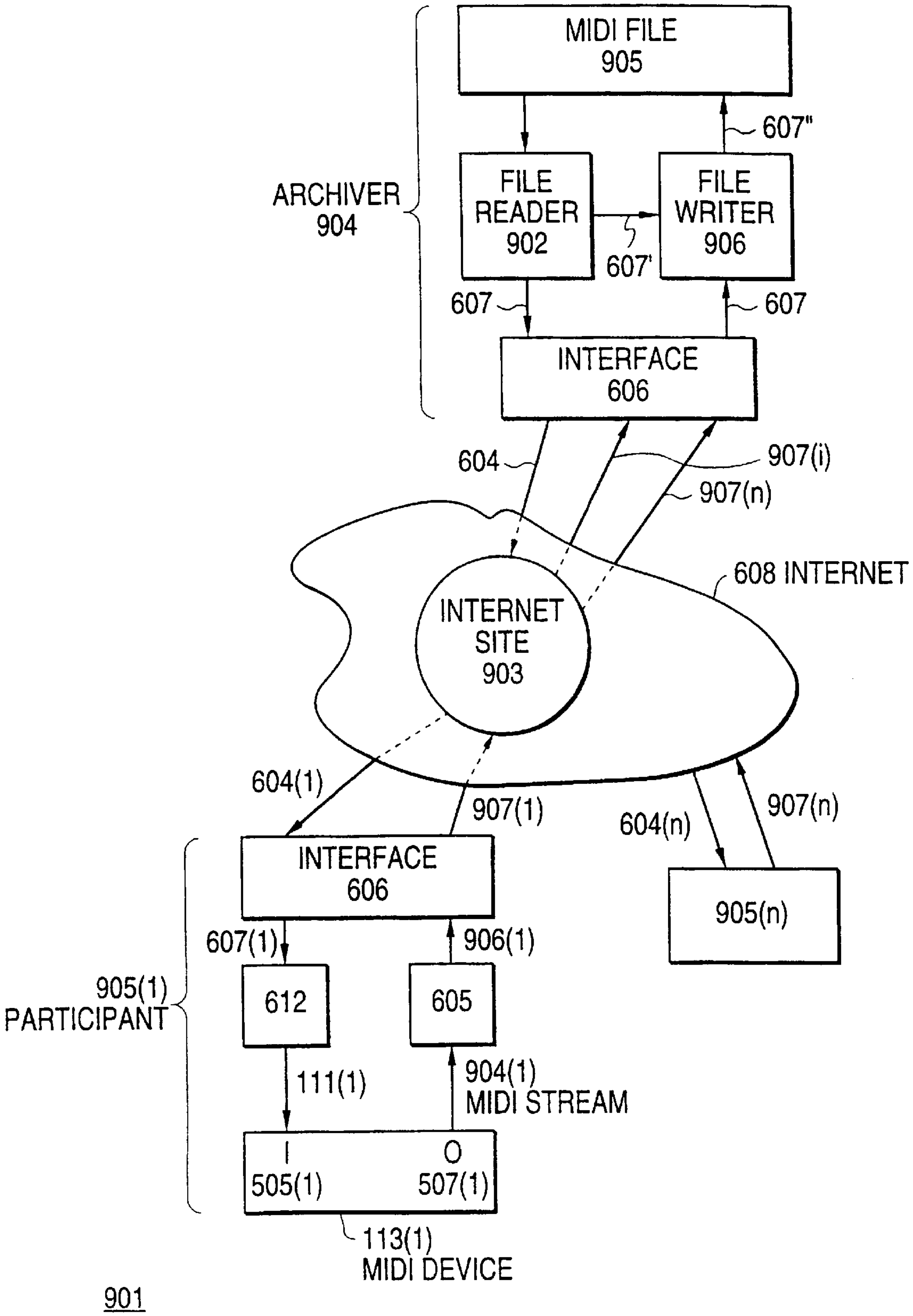
FIG. 9 is an overview of techniques which permit players of MIDI devices to collaborate using the Internet.

A system 901 which permits collaboration across the Internet is shown in FIG. 9. In FIG. 9, a number of participants 905 have connections via Internet 608 with Internet site 903. Each participant 905 not only has a track-stream transformer 612, but also a MIDI track generator 605, and consequently can not only receive a MIDI track from Internet site 903, but can also provide a MIDI track to Internet site 903. Internet site 903 has further been modified not only to provide MIDI tracks to participants 905, but also to receive MIDI tracks from the participants and provide them to the participants 905 or to other entities connected to Internet site 903.

One such entity, archiver 904, is shown in FIG. 9. Archiver 904 stores MIDI files 905 and includes a file reader 902 which reads MIDI file 905 to produce MIDI track 607 and a file writer 906 which reads a MIDI track 607 to produce a MIDI file 905. Since the difference between the MIDI tracks 607 employed in the preferred embodiment and the MIDI tracks 105 employed in standard MIDI files is simply the use of time stamp 211 instead of elapsed time descriptor 119, the transformations performed by reader 902 and writer 906 will pose no problems to those skilled in the art. As will be described in the following, system 901 with archiver 904 and one or more participants 905 can be used to produce music in the same fashion as is done in a modern recording studio.

System 901 as a Distributed Recording Studio

It is now often the case that the musicians recording a song are never present simultaneously in a recording studio. A session may proceed as follows: first a click track is made which sets the tempos for the song. Then the drummer comes in and follows the click track to produce a percussion track; thereupon, the bass player comes and produces his track as he listens to the percussion track. Then the lead vocalists or instrumentalists come and produce their tracks as they listen to the tracks that have already been made. Finally, the background vocalists and instrumentalists produce their tracks as they listen to the previously-made tracks. Once the whole song has been recorded in this fashion, individual participants may redo their tracks so that they better fit the whole.

MIDI music can be produced using system 901 in exactly the same fashion. When system 901 is so used, the MIDI device in a participant 905(*i*) has its own channel. The simplest way of using system 901 is to permit the players to modify a previously-made MIDI track stored in a file in archiver 904. When a player wishes to modify his or her part of the track, the player can request that Internet site 903 establish a connection with archiver 904 and begin receiving track 607 made from the file. Internet site 903 then provides the track in the manner previously described to track-stream transformer 612, which then provides the MIDI stream represented by the track to MIDI device 13(*i*).

The first time through, the performer may simply want to hear the present state of things. When the performer is ready to begin working on his or her part of the performance, he or she requests Internet site 903 to again provide the track, but this time provides a channel parameter to transformer 612 that operates in the manner described above with regard to playing along to inhibit track-stream transformer 612 from outputting event messages for the channel. The performer begins playing his or her part, and his MIDI device 113(*i*) outputs a MIDI stream 904(*i*) of event messages on the MIDI device's channel. Stream 904(*i*) may be simply event messages for the MIDI device's channel, or the MIDI device 13 may also provide all of the event messages that it received in stream 111(*i*). In the latter case, MIDI stream 904(*i*) is effectively the original performance with a new version of the player's channel.

MIDI track generator 605 then makes the stream into a track 906(*i*) with time stamps 211 relative to the beginning of the song, Internet interface 606 sends track 906 as a sequence of packets 907, and Internet site 903 delivers the packets to archiver 904, where a new version of MIDI file 905 is created. If MIDI stream 904(*i*) is only a single channel, file writer 906 can easily integrate the new channel into MIDI file 905 by having file reader 902 read MIDI file 905, removing the event messages for the channel as it does so, and providing the modified track 607' to file writer 906. File writer 906 then simply incorporates the track 906(*i*) with the new version of the channel into track 607' to produce track 607". The incorporation is easily done, since the time stamps in track 906(*i*) indicate where the event messages for the channel are to go in track 607".

The player can repeat the foregoing process as many times as necessary, and the same can be done by each player in the group. An important advantage of working in the manner described above is that it ensures that all of the players are working on the same copy of MIDI file 905. Indeed, all of the techniques employed to ensure consistency of a document produced by a group can be used in system 901.

System 901 can be used for collaboration even where there is no preexisting MIDI file 905 to be worked on. This can be done as follows: all of the musicians have established connections with Internet site 903. Then one musician, perhaps the drummer, begins playing, to produce MIDI stream 904(1), which goes to Internet site 903 and is immediately sent to the participant systems 905 for the other performers. They begin playing as their MIDI devices 113 begin outputting stream 111(1), and as they play, their contributions are output as MIDI tracks 906 (2 . . . n) to Internet site 903, which provides the tracks to archiver 904. Archiver 904 combines the tracks in a MIDI file 905, and that file can be then worked on in the manner just described.

Figure 10:
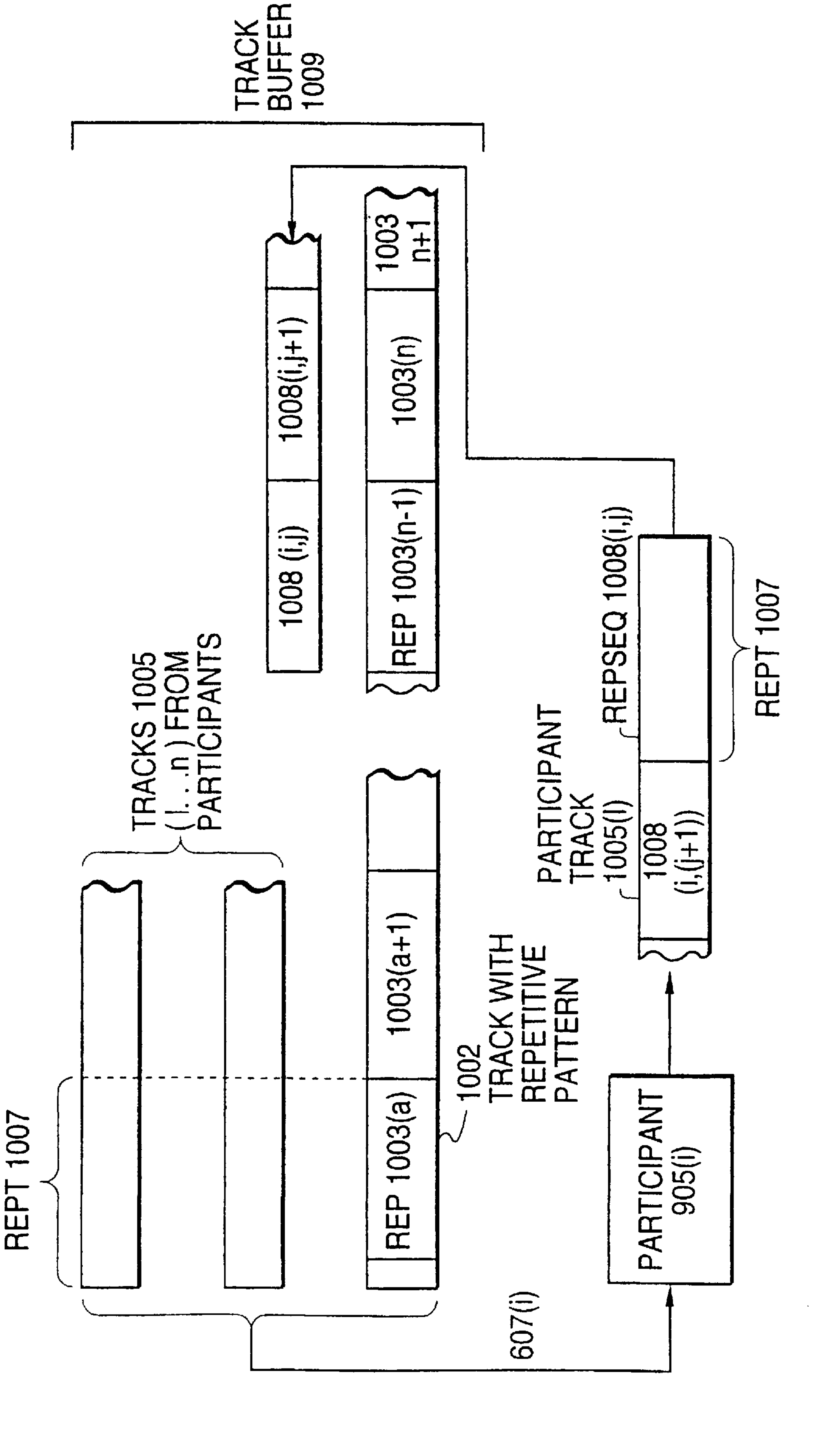
FIG. 10 is a detail of buffer 704 in a version of the system of FIG. 9 which makes it possible for users of the Internet to participate in jam sessions.

Using System 901 for Jam Sessions on the Internet: FIG. 10

One of the new modes of communication which the Internet has made possible is the so called chat session, in which people can send messages to a site in the Internet and receive all of the messages that arrive at the site as they arrive. The result is the equivalent of a conversation among a group of people, except that written messages replace spoken words. Unlike a normal conversation, an Internet chat session can go on forever, with participants coming and going as they like. The musical equivalent of a conversation is a jam session. System 901 makes it possible to have an Internet jam session that is the musical equivalent of an Internet chat session.

The Internet jam session is rendered possible by the fact that there is an underlying repetitive structure in most jam sessions which defines the rhythm and harmony. Everything the participants do fits this underlying structure, and consequently, something that a participant plays in one repetition will generally make sense in a later repetition as well.

When Internet site 903 in system 901 is supporting an Internet jam session, it continually provides at least a track that represents the repetitive pattern as track 607. When a participant 905(*i*) joins the Internet jam session, the track 607(*i*) that he receives is made up of event messages from the repetitive pattern, and if there are currently participants in the jam session, event messages from tracks output from other participants 905. Each track from a participant 905 is synchronized with the repetitive pattern. Of course, because of the delays involved, the tracks from which track 607(*i*) is currently being produced is made up of tracks from participants 905 that were produced at different times. However, because each track works with the repetitive pattern, the tracks will generally also work with each other. When a given participant 905(*i*) begins producing an output track, it becomes one of the tracks from which track 607(*i*) is being produced. As with the play-along application of system 601, the tracks from which the jam session output is produced may contain event messages for a channel that represents a given instrument. If the user of participant 905 plays that instrument, he or she can indicate that fact to participant 905 and Internet site 903. Participant 905 will then not output event messages for that channel to MIDI stream 111(*i*).

FIG. 10 shows the synchronization technique described above in more detail. A track buffer 1009 in Internet site 903 contains the tracks from which the track 607(*i*) sent to participant 905(*i*) is produced. The tracks include a track 102 with a repetitive pattern 1003 which has a repetition time 1007 and may include tracks 1005(1 . . . n) from other participants 905. Tracks 1005(1 . . . n) are synchronized with repetition pattern 1003. A simple way to do this is to reset the value used in the time stamps to 0 at the beginning of each repetition pattern in track 1002 and to set up each participant 905 to do the same with the track 1005 it produces.

A given participant 905(*i*) receives track 607(*i*) which has been produced in the manner just described. Participant 905(*i*) suppresses the event messages for the channel upon which participant 905(*i*) is going to provide output, and then begins providing track 1005(*i*), with time stamps that are synchronized with the periods of the time stamps of track 607(*i*). Track 105(*i*) contains repetition sequences 1008, each of which fits repetitive pattern 1003. When Internet site 903 begins receiving track 1005(*i*), it synchronizes the repetitive sequences 1008 8 in 1005(*i*) with repetitions 1003 and outputs the track as part of output 607 to other participants. As may be seen from the foregoing, a participant 905 may join or leave the jam session at any time, and there may be any musically practical number of participants. Of course, the techniques described above for obtaining and saving the current controller state can be employed in this application as well. There are also many ways of enhancing the Internet jam session experience. For example, the participant could be permitted to listen to the channels for the current participants and select those he wished to jam with. A participant could also request Internet site 903 to make a recording of the MIDI track for his session and send it to him at the end of the session. Internet site 903 could of course use Archiver 904 to do this in the manner described for the distributed recording studio.

Conclusion

The foregoing Detailed Description has disclosed to those skilled in the relevant arts how to make and use systems for distributing music represented as MIDI tracks over non-real-time transmission media such as the Internet and how to use such systems to distribute concerts and recitals as they occur and to permit participation by recipients of such music which ranges from simply playing along through collaborating in the same fashion as is done in sound studios to participating in Internet jam sessions. An important part of the systems described herein has been techniques for dealing with the varying delay inherent in non-real-time transmission media and in track players implemented in computer systems with non-real-time operating systems.

Though the Detailed Description has disclosed the best mode for implementing his systems presently known to the inventor, many other implementations which embody the principles disclosed herein are possible. For example, the replacement of time stamps relative to immediately-preceding events with time stamps relative to a single point in time greatly simplifies the implementation of the systems described herein, they may also be implemented with time stamps relative to immediately preceding events. Second, though the systems described herein are implemented for MIDI as a representation of music, the principles disclosed herein may be applied to MIDI in any of its other applications, or indeed generally to other protocols which have the properties of MIDI. The techniques for dealing with controller state discloses herein may further be employed with any protocol which has cumulative state. Moreover, many embodiments may be made for distributing MIDI music which employ the principles disclosed herein but use different coding techniques or run in different environments, The foregoing being the case, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A MIDI track, the MIDI track comprising:

a sequence of MIDI events, each event including an event message; and a time stamp, the time value in each time stamp of each event being relative to the same single event in the sequence.

2. The MIDI track set forth in claim 1 wherein:

the single event is the first event in the sequence.

3. A MIDI server comprising:

a track reader for reading the MIDI track set forth in any of claim 1 or 2 and using a non-real time protocol to provide the MIDI track to one or more clients.

4. The MIDI server set forth in claim 3 further comprising:

a receiver that receives the MIDI track in the MIDI server; and the track reader reads the MIDI track while the MIDI track is being received in the MIDI server.

5. The MIDI server set forth in claim 3 wherein:

the track reader provides the MIDI track to a given one of the clients beginning at a given event other than the first event in the MIDI track and in connection with so doing, provides a current controller state for the given event to the client.

6. The MIDI server set forth in claim 5 further comprising:

a memory device that stores stored controller state separately from the MIDI track; and the MIDI server employs the stored controller state in providing the current controller state.

7. The MIDI server set forth in claim 6 wherein:

the stored controller state summarizes a prior controller state of an event prior to the given event, whereby the MIDI server is required to store only a portion of the MIDI track that begins at the event prior to the given event.

8. The MIDI server set forth in claim 3 wherein:

the MIDI server further provides a delay parameter to the one or more clients in association with the MIDI track.

9. Apparatus for generating a MIDI track, the apparatus comprising:

a receiver that receives a MIDI stream; and a generator that generates the MIDI track of any of claims 1 through 2 therefrom.

10. The apparatus for generating a MIDI track set forth in claim 9 further comprising:

a track provider that provides the MIDI track as it is generated to a server for distribution to clients of the server while the MIDI track is being received in the server.

11. The apparatus for generating a MIDI track set forth in claim 9 wherein:

the track provider provides the track to the server by means of a non-real-time protocol.

12. Apparatus for generating a MIDI stream from a MIDI track comprising:

a track reader for reading the MIDI track of any of claims 1 through 2 and a MIDI stream generator for generating a MIDI stream therefrom while the track is being read by the track reader.

13. The apparatus for generating a MIDI stream from a MIDI track of claim 12 wherein:

the MIDI track reader receives the track via a non-real-time protocol; and the MIDI stream generator further comprises a delayer that waits a delay period before the MIDI stream generator begins reading the track.

14. The apparatus for generating a MIDI stream from a MIDI track of claim 13 wherein:

the delay period is at a minimum the period required to receive enough of the MIDI track that a predetermined period of time is required for the MIDI stream generator to play the track.

15. The apparatus for generating a MIDI stream from a MIDI track of claim 14 wherein:

the delayer receives a delay parameter that specifies the predetermined period of time from a user of the apparatus for generating a MIDI stream.

16. The apparatus for generating a MIDI stream from a MIDI track of claim 15 wherein:

the MIDI track reader receives a parameter for the delay period in association with the track and provides the parameter to the delayer.

17. The apparatus for generating a MIDI stream from a MIDI track of claim 12 wherein:

the MIDI track reader receives the track beginning with an arbitrary event therein and receives current controller state for the arbitrary event prior to receiving the arbitrary event.

18. The apparatus for generating a MIDI stream from a MIDI track of claim 17 wherein:

the current controller state is a sequence of MIDI controller events.

19. The apparatus for generating a MIDI stream from a MIDI track of claim 12 wherein:

the MIDI event message includes a channel specifier of a plurality thereof;

the MIDI stream generator receives a channel parameter specifying at least one of the channel specifiers; and the MIDI stream generator does not output event messages to the MIDI stream that have the channel specifier specified in the channel parameter.

20.A method of generating a first MIDI stream or a second MIDI track from a first MIDI track such that a MIDI device which is playing the first MIDI stream or a second MIDI stream produced from the second MIDI track begins playing at a given point which is not at the beginning of the first MIDI track, the method comprising the steps of:

in a portion of the first MIDI track that precedes the given point, reading MIDI event messages from the first MIDI track that define a starting state for the MIDI device;

placing MIDI event messages that produce the defined starting state in the MIDI device but do not cause the MIDI device to play at the beginning of the first MIDI stream or the second MIDI track; and beginning at the given point, placing MIDI event messages from the first MIDI track that do cause the MIDI device to play in the first MIDI stream or second MIDI track.

21. The method of generating a first MIDI stream or a second MIDI track set forth in claim 20 wherein:

the step of placing MIDI event messages is performed by placing the MIDI event messages as they are read from the first MIDI track.

22. The method of generating a first MIDI stream or a second MIDI track set forth in claim 20 further comprising the step of:

making a definition of the starting state from the read MIDI event messages and storing the definition separately from the first MIDI track; and in the step of placing MIDI event messages, the MIDI event messages are produced using the separately-stored definition.

23. The method of generating a first MIDI stream or a second MIDI track set forth in claim 22 wherein:

the separately-stored definition is the read MIDI event messages that define the starting state; and in the step of placing MIDI event messages, the MIDI event messages are produced from the read MIDI event messages in the separately-stored definition.

24. The method of generating a first MIDI stream or a second MIDI track set forth in claim 22 wherein:

the separately-stored definition defines the starting state at a point prior to the given point; and the step of placing MIDI event messages further includes the step of producing the MIDI event messages placed in the first MIDI stream or second MIDI track from MIDI event messages occurring between the point prior to the given point and the given point.

25. An improved MIDI track, the improvement comprising:

control state information associated with the MIDI track but distinct therefrom, the control state information containing information from which a starting state at a given point in the MIDI track other than the beginning thereof may be produced for a MIDI device which is playing the track, whereby the MIDI device may begin playing the MIDI track at a point other than the beginning thereof.

26. The improved MIDI track set forth in claim 25 wherein:

the control state information is MIDI event messages from the MIDI track that do not cause the MIDI device to play.

27. The improved MIDI track set forth in claim 25 wherein:

the control state information specifies the results of MIDI event messages that affect the starting state at the given point.

* * * * *